US005119560A

United States Patent [19]

Noble

[11] Patent Number: 5,119,560

[45] Date of Patent: Jun. 9, 1992

[54] MEDICINE DOSAGE DEVICE

[75] Inventor: Terrance O. Noble, Rosemount, Minn.

[73] Assignee: Apothecary Products, Inc., Burnsville, Minn.

[21] Appl. No.: 638,386

[22] Filed: Jan. 7, 1991

[51] Int. Cl.[5] .......... A47J 43/28

[52] U.S. Cl. .......... 30/125; 30/124; 30/141

[58] Field of Search .......... 30/125, 124, 141; 206/216; 239/33; 229/1.56

[56] References Cited

U.S. PATENT DOCUMENTS

| | | | |
|---|---|---|---|
| D. 203,143 | 12/1965 | Lisczawka | 30/141 |
| 2,252,119 | 8/1941 | Edmonds | 30/141 |
| 2,453,525 | 11/1948 | McNeill | 30/125 |
| 2,550,210 | 4/1951 | Vance, Jr. | 30/141 |
| 2,795,043 | 6/1957 | Fleischer | 30/141 |
| 2,953,170 | 9/1960 | Bush | 30/141 |
| 4,192,360 | 3/1980 | Rodriquez | 30/141 |

*Primary Examiner*—Frank T. Yost
*Assistant Examiner*—Hwei-Siu Payer
*Attorney, Agent, or Firm*—Merchant, Gould, Smith, Edell, Welter, & Schmidt

[57] ABSTRACT

An improved dosage container is disclosed which includes a tubular container having an open end with a spoon member integrally formed therewith and projecting axially therefrom. A sealing cap consists of concentric external and interanl tubular members spaced apart to define a recess that is sized and configured to receive spoon member. The external member of the sealing cap threads onto the container, and the internal member of the sealing cap includes O-rings that engage the tubular container to seal both the spoon and the liquid contents. A pill container is integrally formed at the base of the tubular container to receive pills, tablets, capsules or the like.

17 Claims, 2 Drawing Sheets

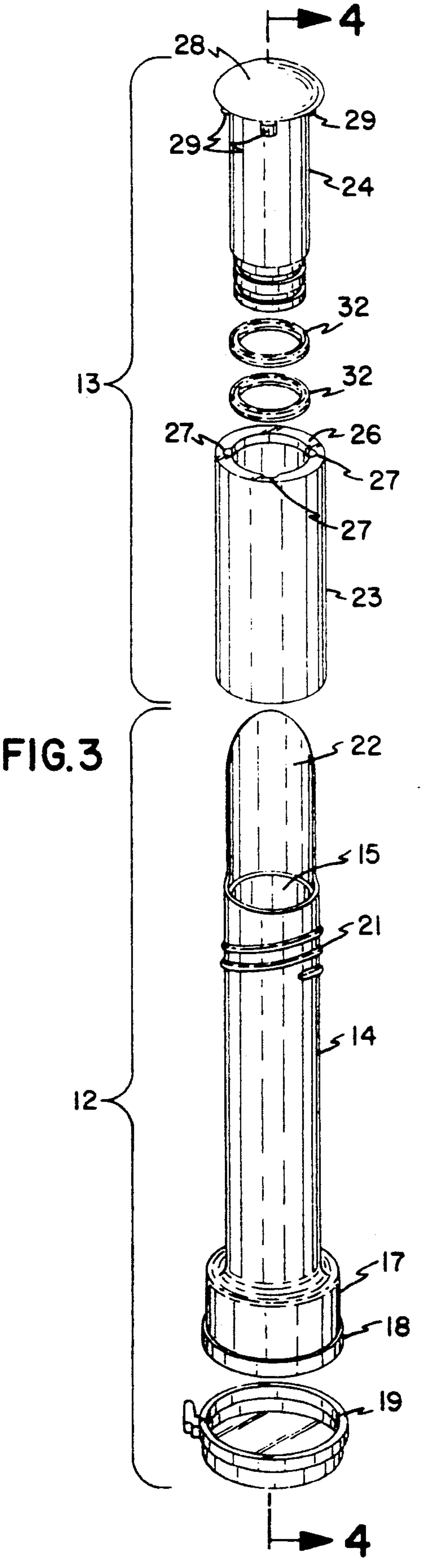
FIG. 3
FIG. 4
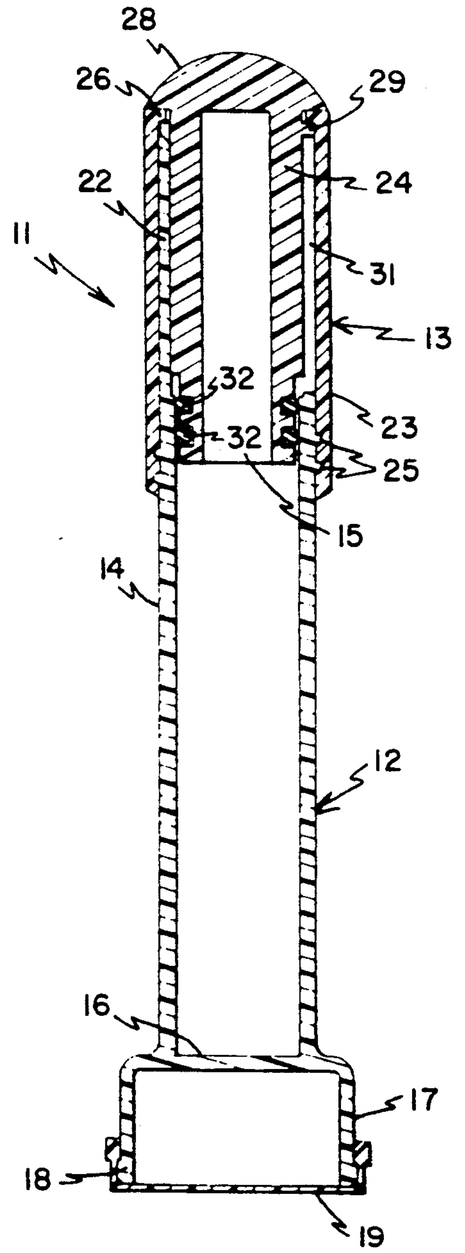

MEDICINE DOSAGE DEVICE

BACKGROUND OF THE INVENTION

The invention broadly relates to medicine dosage devices, and is specifically directed to a device for sealably carrying and dispensing a predetermined amount of liquid medicine.

Medicine in liquid form is commonly used because it is more easily ingested than pills and capsules. It is often made in syrup form and flavored to be more palatable to children.

However, there are several drawbacks with liquid medicines, not the least of which is spillage when it is poured from its container. Leaking and dripping of the substance from the neck or top of the container are also problematic, particularly when the medicine is in syrup form, which is usually quite sticky. As such, the container itself and articles with which the medicine comes into contact have a sticky residue and become contaminated easily, requiring that they be cleaned.

Because of such problems, it is generally quite convenient for an individual to carry a container of liquid medicine for doses throughout the day. Further, a separate spoon for taking doses must be carried or be made available, which not only is inconvenient but also has the same problem of stickiness, contamination and the need for cleaning.

Dosage devices for liquid medicine having an integral dispensing spoon are available, but have many of the same problems because of the nature of liquid medicine. Such devices typically consist of a tube closed at one end to define a container portion with a spoon bill integrally formed at the open end. Liquid medicine is typically poured into the tubular container portion of the device in a desired volume or dose, and dispensed by pouring the medicine from the container portion, through the integral spoon bill and into the user's mouth.

However, such devices generally do not include caps or other closures. As such, they are not usable as medicine containers, but rather only as dosage devices. After the dose is taken, the dosage device must be cleaned, or it will remain sticky and become contaminated before the next use.

Some dosage devices of this type include closure plugs for the container portion, but the spoon bill remains exposed and hence subject to the same types of problems.

The inventive dosage device utilizes the advantages of the prior art devices but eliminates the problems and disadvantages. It also takes the form of a tubular container closed at one end, and its open end includes an integrally formed spoon bill. In the preferred embodiment, a portion of the side wall of the container at the open end is cut away, leaving a dispensing spoon bill having a curvature that is the same as the tubular side wall.

The improved dosage device further includes a sealing cap that slides over the spoon bill, sealing the entire open end of the dosage device. At the same time, the outer and inner surfaces of the spoon bill are sealed from the medicine as well as the outside environment, regardless of the position of the spoon. This is accomplished by forming the cap with concentric external and internal tubular members that are internally spaced and configured to define an annular recess having the same curvature as and which receives the entirety of the spoon portion. The exposed lower end of the internal tubular member carries one or more 0-rings that sealably engage the spoon and open end of the container, and the lower internal portion of the external tubular member is threaded to screw onto the tubular container. As such, the open end of the tubular container is sealably closed to keep the contained liquid medicine from being contaminated as well as to prevent it from leaking. At the same time, the annular recess in the sealing cap sealably contains both the outer and inner surfaces of the spoon bill, keeping them from becoming contaminated. This construction also prevents liquid medicine from crystallizing on the spoon bill and making it difficult to remove the sealing cap.

In the preferred embodiment, the sealing cap is formed from separate but interlockable external and internal tubular members that may be easily separated for cleaning.

In addition, the improved dosage device advantageously includes a pill container integrally formed on the closed end of the tubular container, permitting pills, tablets, capsules or the like to be simultaneously carried with liquid medicine. The pill container in the preferred embodiment is slightly larger in diameter than the tubular container, providing the overall device with a base on which it may stand in upright fashion.

The structural features and advantages of the improved dosage device will be more fully appreciated from the description below and accompanied drawings.

BRIEF DESCRIPTION OF THE DRAWINGS

FIG. 3 is an exploded perspective view of the dosage device; and

FIG. 4 is a sectional view of the dosage device taken along the line 4—4 of FIG. 3, with the components in assembled relation.

DETAILED DESCRIPTION OF THE PREFERRED EMBODIMENT

Figure 1:
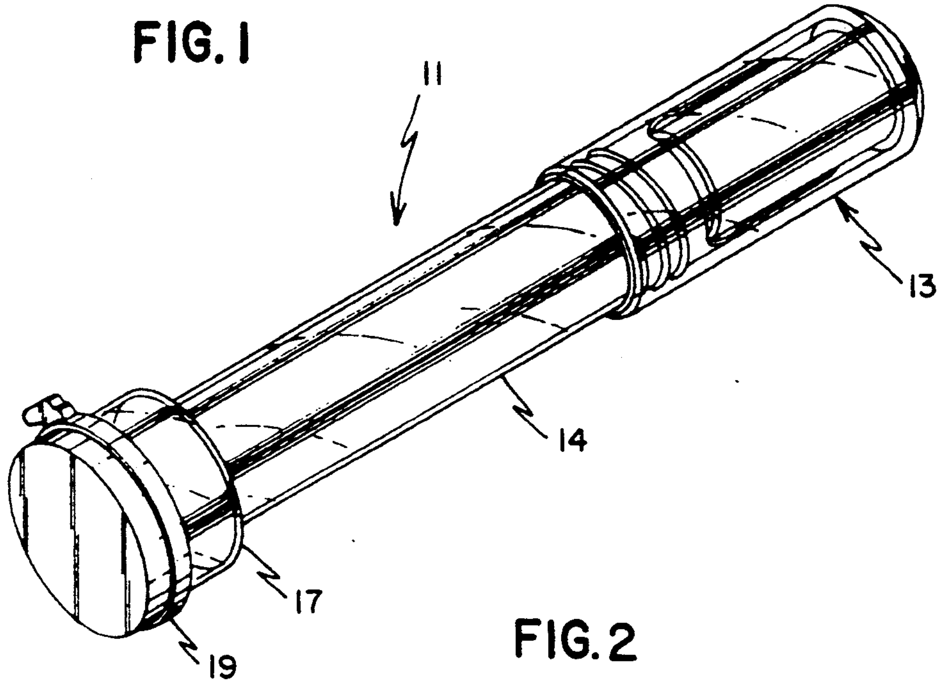
FIG. 1 is a perspective view of a liquid medicine dosage device embodying the invention.

With reference to the figures, an improved medicine dosage device is represented generally by the numeral 11. Dosage device 11 broadly comprises a container 12 and a sealing cap 13 that sealably closes the container 12 in air tight relation.

With specific reference to FIGS. 3 and 4, container 12 consists of a tubular member 14 which in the preferred embodiment is circular in configuration. Tubular member 14 has an upper open end 15 and a wall 16 closing its lower end. Wall 16 forms part of an integral pill container 17, also of circular configuration but having a larger diameter than tubular member 14. Pill container 17 has an annular lip 18 at its lower edge to receive and retain a flexible closure member or cap 19. The pill container 17 is of sufficient diameter to support the dosage device 11 in an upright standing position as shown in FIGS. 2 and 4, and may also contain pills, tablets, capsules or the like that are accessible by turning the device 11 upside down from the position shown in FIGS. 2 and 4 and removing the closure 19.

With continued reference to FIG. 3, threads 21 are formed on the outside surface of tubular member 14 below the open end 15, the purpose of which will be described in further detail below.

Figure 2:
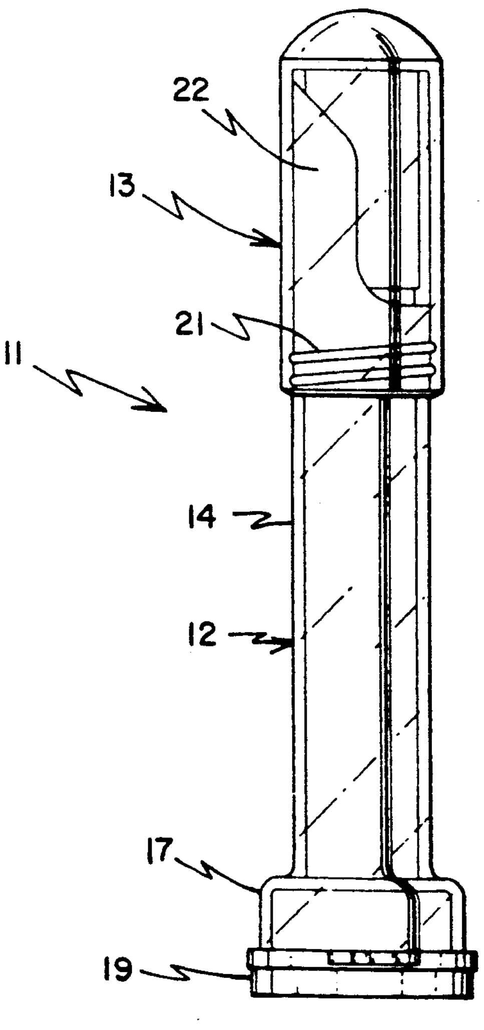
FIG. 2 is a view inside elevation of the dosage device.

With reference to FIGS. 2 and 3, a spoon member 22 projects axially from the open end 15. As best shown in FIG. 2, spoon member 22 is integrally formed with tubular member 14, and in effect is an extension of the tubular wall of member 14 with a portion cut away. As such, spoon member 22 has a curvature based on the radius of tubular member 14.

Although not shown for purposes of clarity, tubular member 14 includes printed graduations of a range of ¼-2 teaspoons and 1-10 milliliters. Such graduations may be used to indicate the amount of liquid medicine remaining in container member 14, and may also be used by filling the empty tubular member with a precise amount of liquid medicine to be administered at a particular time.

With reference to FIGS. 3 and 4, sealing cap 13 comprises a first external tubular member 23 and an internal tubular member 24. As best shown in FIG. 4, the inside diameter of external tubular member 23 corresponds to the outside diameter of tubular member 14, permitting it to slide thereover in telescoping relation. Threads 25 are formed in the inner face of the external tubular member 23 at its lower end for threadable engagement with threads 21.

As best shown in FIG. 3, the upper end of external tubular member 23 terminates in a flange that projects radially inward. Three axial grooves 27 spaced at 90 degree intervals are formed in the inner edge of flange 26.

Internal tubular member 24 is open at its lower axial end but closed at its upper end by a domed, integrally formed top 28, the outside diameter of which corresponds to the outside diameter of external tubular member 23. As best shown in FIGS. 3, three bosses 29 project outwardly from the outer face of tubular member 24 in the same circumferential spacing as grooves 27. As best shown in FIG. 4, bosses 29 are spaced from the underside of top 28 by an amount that corresponds approximately to the thickness of flange 26. As such, and also as best shown in FIG. 4, internal tubular member 24 may be inserted through the top circular opening of external tubular member 23, and with the bosses 29 registered with grooves 27, tubular member 24 may be inserted until the underside of top 28 engages flange 26. Top 28 may then be twisted clockwise or counterclockwise in bayonet fashion, and the tubular members 23, 24 are then rigidly interlocked.

The outer diameter of internal tubular member 24 is chosen so that, in the assembled relation, it defines an annular space or recess 31 (FIG. 4) with the inner surface of external tubular member 23. The length and thickness or radial dimension of annular space 31 is chosen to permit insertion of the spoon member 22. In addition, the lower end of internal tubular member 24 is formed with annular grooves to receive a pair of 0-rings 32.

As constructed, and with particular reference to FIG. 4, when sealing cap 13 is placed on the top of container 12, spoon 22 projects into annular space 31. Sealing cap 13 is then screwed onto container 12 with threads 21, 25 in threadable engagement. When the cap 13 is fully tightened, the 0-rings 32 engage the upper end of tubular member 14 at the open end 15. As such, 0-rings 32 perform a dual function of sealing spoon member 22 in the annular recess 31, and also sealing the liquid medicine in container 12. 0-rings 32 provide an air tight seal and therefore prevent contamination of both the spoon member 22 and liquid contained in container 12.

In the preferred embodiment, the container 12, excluding cap 19, is injection molded from thermoplastic material such as polypropylene or acrylic, and the external and internal tubular members 23, 24 are molded from the same material. Preferably, container 12 is transparent to determine the level of contained liquid, and as indicated above, it preferably includes visual graduations both in teaspoons and milliliters. In the preferred embodiment, tubular members 23, 24 are translucent. Sealing cap 19 is preferably injection molded from the same material as container 12, and 0-rings 32 are molded from a resilient sealing material such as silicone or a silicone rubber polymer.

In operation, container 12 may be filled with liquid medicine to provide several doses. Each dose may be administered by simply removing sealing cap 13 and placing the spoon portion 22 into the patient's mouth and pouring the proper amount as determined by the visible graduations. Alternatively, it is possible to fill a container 12 with the precise amount necessary for a particular dose, as indicated by the visual graduations, which may then be subsequently administered to the patient using the spoon member 22. In either case, the sealing cap 13 sealably closes the container 12, preventing contamination of both the contained liquid and both sides of spoon member 22, both before and after administration of a dose.

After use, the external and internal tubular members 23, 24 are easily separated using the bayonet mount of bosses 29 and grooves 27, and O-rings 32 may also be removed for complete cleansing. Pills, capsules or tablets may be simultaneously contained in the pill container 17 in the event medications of both types are necessary for a particular illness.

What is claimed is:

1. A container for sealably carrying and dispensing liquids, comprising:

tubular container means having open and closed ends to receive and contain liquid;

spoon means of predetermined length projecting longitudinally from the open end of the tubular container means in liquid communication therewith to dispense liquid into the mouth of a user; and sealing cap means for fitting over the entirety of said projecting spoon means and the open end of said tubular container means in sealable relation therewith, comprising:

an external tubular member having first and second ends, the first end being open the external tubular member and said first end being sized to fit over the entirety of said projecting spoon means and at least a portion of the tubular container means in telescoping relation;

an internal member disposed within and carried by the external tubular member and defining a space therewith into which said spoon means may project;

first sealing means for establishing a seal between external tubular member and the outer surface of the tubular container means; and second sealable means for effecting a seal between the internal member and the inner surface of said tubular container means.

2. A container for sealably carrying and dispensing liquids, comprising:

tubular container means having open and closed ends to receive and contain liquid;

spoon means of predetermined length projecting longitudinally from the open end of the tubular container means and in liquid communication therewith to dispense liquid into the mouth of a user, the spoon means having a predetermined spoon curvature that is substantially uniform over its length; and sealing cap means for fitting over the entirety of said projecting spoon means and the open end of said tubular container means in sealable relation therewith, comprising:

an external tubular member having first and second ends, the first end being open, and the external tubular member and said first end being sized to fit over the entirety of said projecting spoon means and at least a portion of the tubular container means in telescoping relation;

an internal member having first and second ends oriented relative to the first and second ends of the external tubular member, the internal member being carried by the external tubular member and defining a space therewith corresponding in configuration to said substantially uniform spoon curvature, the entirety of said projecting spoon means being insertable into said space;

closure means for closing the second end of the external tubular member; and sealing means on said sealing cap means for sealably engaging said tubular container means proximate the open end thereof.

3. The container defined by claim 2, wherein the tubular container means, and the external tubular member and internal member of said sealing cap means are of circular configuration.

4. The container defined by claim 3, wherein the spoon means comprises a circular segment.

5. The container defined by claim 4, wherein the spoon means is integrally formed with said tubular container means.

6. The container defined by claim 4, wherein the space between said external tubular member and said internal member comprises an annular recess.

7. The container defined by claim 6, wherein the sealing means comprises O-ring means mounted on said internal member and disposed in said annular recess.

8. The container defined by claim 2, wherein:

the external tubular member has an internal cross-sectional configuration corresponding to said spoon curvature; and the internal member projects longitudinally into said external tubular member and has an external cross-sectional configuration corresponding to said spoon curvature to define said space.

9. The container defined by claim 2, wherein the closure means is carried on the second end of the internal member and sized to overlie and close the second end of the external tubular member.

10. The container defined by claim 9, wherein the external tubular member and internal member are of circular configuration, and the closure means further comprises bayonet mounting means joining the external tubular member and internal member.

11. The container defined by claim 10, wherein the bayonet mounting means comprises:

an inwardly projecting flange disposed on the second end of said external tubular member, the flange having a plurality of circumferentially spaced grooves formed on the inner edge thereof; and a like number of bosses projecting from the outer face of the internal member, the bosses being sized and spaced for insertion into said grooves in bayonet relation.

12. The container defined by claim 11, wherein the bosses are axially spaced from said closure member by an amount corresponding to the thickness of said flange.

13. The container defined by claim 2, wherein the sealing means comprises thread means on the internal surface of the external tubular member and the external surface of the tubular container means to permit said sealing cap means to be screwed onto said container means in sealable relation.

14. The container defined by claim 2, which further comprises a receptacle mounted at the closed end of said tubular container means, and a closure member for said receptacle.

15. The container defined by claim 1, wherein the tubular container means and spoon means are integrally molded from thermoplastic material.

16. The container defined by claim 1, wherein the sealing cap means is molded from thermoplastic material.

17. The container defined by claim 2, wherein the sealing means is constructed and arranged to seal the spoon means within said space.

* * * * *